United States Patent [19]

Kitabayashi

[11] Patent Number: 4,653,923

[45] Date of Patent: Mar. 31, 1987

[54] FOCUSING METHOD FOR INTERFEROMETER

[75] Inventor: Junichi Kitabayashi, Machida, Japan

[73] Assignee: Ricoh Company, Ltd., Tokyo, Japan

[21] Appl. No.: 683,714

[22] Filed: Dec. 19, 1984

[30] Foreign Application Priority Data

Dec. 20, 1983 [JP] Japan ................ 58-238854

[51] Int. Cl.[4] .............................................. G01B 9/02
[52] U.S. Cl. .................... 356/360; 356/124
[58] Field of Search ............... 356/360, 124; 250/201

[56] References Cited

U.S. PATENT DOCUMENTS 3,719,421 3/1973 Poilleux et al. ................. 250/201 X
3,740,150 6/1973 Munnerlyn ........................... 356/360

Primary Examiner—Davis L. Willis
Assistant Examiner—Matthew W. Koren
Attorney, Agent, or Firm—Oblon, Fisher, Spivak, McClelland & Maier

[57] ABSTRACT

A focusing method for interferometer wherein a light flux passing through a converter lens for converting the shape of wave fronts is caused to be incident on a tested surface and a testing light beam reflected by the tested surface is caused to be incident on a light receiving element capable of measuring the distribution of intensity of the light at least one-dimensionally. The tested surface is moved in the direction of its center axis until it reaches a position in which the vertex of the tested surface coincides with the focus of the converter lens and the output of the light receiving element shows a peak value, and the tested surface is further moved, from the position referred to hereinabove which serves as a reference position, in the direction of its center axis.

4 Claims, 21 Drawing Figures

FOCUSING METHOD FOR INTERFEROMETER

BACKGROUND OF THE INVENTION

This invention relates to a focusing method for interferometer.

Various types of interferometer have been known. One of them is an interferometer in which a testing beam from a tested surface and a reference beam are caused to interfere with each other, and another interferometer is of a shearing type in which a light beam from a tested surface is split into two sub-beams to thereby split the wave front of the testing beam into two segments which are displaced transversely and made to interfere with each other. When the accuracy of the surface of a mirror or lens is tested for irregularities by using an interferometer, for example, it is necessary to perform focusing to place the tested surface in a position in which testing can be carried out. To this end, it has hitherto been usual practice to perform a focusing operation in such a manner that the tested surface is first placed in a position which is assumed to be the focusing position in the direction of its center axis to produce an interference fringe.

Meanwhile, to ascertain the contour of the tested surface by testing same, it is necessary to learn the radius of curvature of a wave front (reference wave front) applied to the tested surface at the time testing was performed. Since the test is based on the determination of a difference (or a value corresponding to the difference) in configuration between the reference wave front and the actual tested surface, it would be impossible to accurately determine the contour of the actual tested surface unless the radius of curvature of reference wave front is known. When the method of the prior art referred to hereinabove for effecting focusing is used, difficulties are experienced in accurately determining the radius of curvature of the reference wave front because the method merely brings the tested surface to an optimum position (focusing position).

SUMMARY OF THE INVENTION (1) Object of the Invention

This invention has been developed for the purpose of obviating the aforesaid problem raised in the prior art. Accordingly, the invention has as its object the provision of a focusing method for interferometer enabling the radius of curvature of a reference wave front to be determined accurately.

(2) Statement of the Invention

According to the invention, there is provided a focusing method for interferometer comprising the steps of: passing a light beam through a converter lens to convert the shape of wave fronts of the light beam and causing said light beam to be incident on a tested surface, causing a testing light beam reflected by said tested surface to be incident on a light receiving element capable of measuring the distribution of intensity of the light beam at least one-dimensionally while moving the tested surface in the direction of its center axis until it reaches a position in which the vertex of the tested surface is brought into coincidence with the focus of the converter lens and the light receiving element show an output of peak value, and using said position as a reference position and moving the tested surface fro said reference position further in the direction of its center axis, to thereby perform focusing.

In the method according to the invention, the position of the tested surface in which the vertex of the tested surface is brought into coincidence with the focus of the converter lens and the output of the light receiving element shows a peak value is used as a reference position, and the tested surface is moved from the reference position to a focusing position to effect focusing. This makes it possible to determine with increased accuracy the radius of curvature of the reference wave front corresponding to the tested surface, to thereby the contour of the tested surface to be tested with increased accuracy.

DESCRIPTION OF THE PREFERRED EMBODIMENTS

Preferred embodiments of the invention will now be described by referring to the accompanying drawings.

Figure 1:
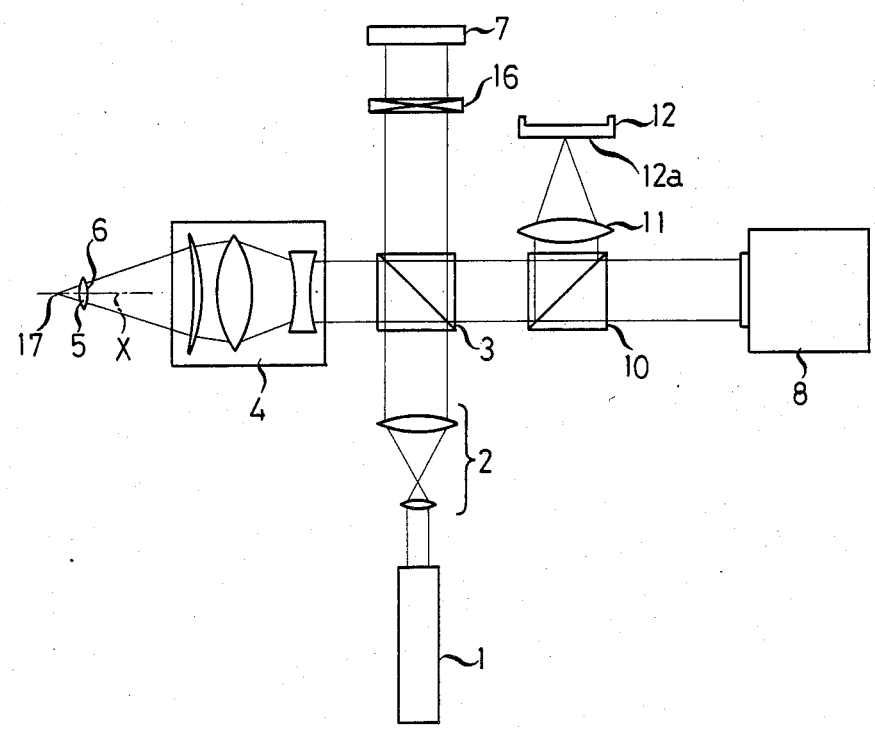
FIG. 1 is a schematic view in explanation of one example of the interferometer.

FIG. 1 shows an interferometer used for testing the surface conditions of an article to be tested by causing a testing light beam reflected by the article to be tested and a reference light beam to interfere with each other to test the accuracy of operations performed thereon. Such instrument also enables to determine whether there are irregularities on the surface, an error in the radius of curvature of the surface or a distortion of the surface. To enable the invention to be understood thoroughly, the construction and operation of the interferometer will be outlined before describing the embodiments of the invention.

In FIG. 1, a light beam emitted by a laser system 1 is enlarged by a beam expander 2 into a light flux of parallel rays (planar waves) of a suitable diameter before being incident on a beam splitter 3. The light flux incident on the beam splitter 3 is reflected thereby and passes through a converter lens 4 to convert the configuration of its wave front. Before the light flux is focussed as indicated at 17, it reaches a tested surface 6 of the article to be tested.

In the interest of brevity, the tested surface 6 will be described as being that of a convex lens 5 (hereinafter tested lens) which should be spherical in configuration, and the planar waves of the light flux before being incident on the converter lens 4 will be described as being converted to spherical waves by the lens 4.

If the tested surface 6 is truly spherical and if the center of the radius of curvature of the tested surface and the center of the radius of curvature of the spherical waves released from the converter lens 4 coincide with each other, then a light flux reflected by the tested surface 6 or a testing light beam moves in an opposite direction through the path which it previously moved toward the lens 4, so that it will be converted to a light flux of parallel rays (planar waves) by the converter lens 4 again. However, if the tested surface 6 has an irregularity or a distortion (the test is being performed to detect such fault), then the testing light beam passing through the converter lens 4 again does not have a perfect planar wave form no matter how minuscule the irregularity or distortion may be, and its wave form will vary depending on the irregularity or distortion.

Meanwhile, the light flux of parallel rays emitted by the laser system 1 and passing through the beam splitter 3 is reflected by a reference mirror 7 and a reflected light beam returns to the beam splitter 3 without having its wave form converted, to be used as a reference light beam. The reference light beam and the testing light beam reflected by the tested surface 6 are indicent on an area sensor 8 while interfering with each other, and they are inputted to a display unit or other device of a computer as data, to enable the surface conditions of the tested surface 6 to be tested. The area sensor may be in the form of a CCD, a camera tube or a photodiode array. A video camera may be used in place of the area sensor.

As outlined hereinabove, the surface conditions of the tested lens 5 can be tested by means of an interferometer. In performing the testing operation, it is necessary that focusing be performed beforehand to bring the tested lens 5 to a position in which a test can be performed. The focusing operation can be performed by the method according to the invention which will presently be described.

In FIG. 1, a second beam splitter 10 is located between the beam splitter 3 and the area sensor 8 to reflect light which is incident on a light receiving element 12 after being collected by a condenser lens 11. The light receiving element 12 may be in the form of a sensor or CCD, for example, comprising a multiplicity of light receiving sections arranged on a light receiving surface 12a either two-dimensionally in one plane or one-dimensionally on a straight line. Stated differently, the light receiving element 12 may be of any suitable form so long as it is capable of measuring the distribution of the intensity of the testing beam at least one-dimensionally. The condenser lens 11 has its focus on the light receiving surface 12a of the light receiving element 12, with the lens 11 being parallel to the light receiving surface 12a. Thus, when a light flux of parallel rays is incident on the lens 11, the light flux is received by the element 12 and forms a dot on the light receiving surface 12a.

Meanwhile, a shutter 16 is located between the first beam splitter 3 and the reference mirror 7. The shutter 16 is open when the testing operation described hereinabove is performed, so that the light flux passing through the first beam splitter 3 reaches the reference mirror 7 without being interfered with by the shutter 16, and the light reflected by the mirror 7 can return to the beam splitter 3 without any interference. Likewise, the light flux passing through the second beam splitter 10 when the testing operation is performed, so that there is no risk that the presence of the beam splitter 10 might interfere with the testing operation.

When focusing is performed, the shutter 16 is closed to block the passage of light between the first beam splitter 3 and the reference mirror 7. If a laser beam is emitted by the laser system 1 when the shutter 16 is closed, then only the testing light beam reflected by the tested surface 6 is reflected by the second beam splitter 10 and incident on the light receiving element 12, without a reference light beam being incident on the light receiving element 12. At this time, the manner in which the testing light beam is incident on the light receiving element 12 may vary depending on the position of the tested lens 5 in the direction of a center axis X (the optical axis of the tested lens 5 in this embodiment) of the tested surface 6. Thus, it is possible to perform focusing in accordance with the manner in which the light is incident on the light receiving element 12. The details of focusing will be presently described.

FIGS. 2 to 6 show the tested lens 5 disposed in different positions in the direction of its center axis X in relation to the light flux L illuminating the tested surface 6 of the tested lens 5. First, the positions of the tested lens 5 will be described in relation to the manner in which the light receiving element 12 receives light incident thereon. In FIGS. 2 to 6, a multiplicity of arcs shown in the light flux L are wave fronts (spherical waves) of the light flux L, and R represents the radius of curvature of the tested surface 6. In the case of the embodiment shown, the tested surface 6 is designed to be spherical in shape but the tested surface 6 may not necessarily be a perfectly spherical shape because of irregularities thereon and possible distortion thereof. Therefore, in the description to be set forth hereinafter, the radius of curvature of the tested surface 6 shall be referred to as an approximate radius of curvature.

Figure 2:
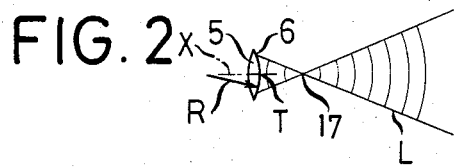
FIGS. 2 to 6 are views in explanation of the tested surface being moved in the direction of its center axis.
Figure 7:
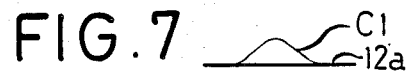
FIG. 7 to 11 are views showing the outputs of the light receiving element when the tested surface is located in positions shown in FIGS. 1 to 6 respectively.

In FIG. 2, the tested surface 6 is shown disposed leftwardly of the focus 17 of the converter lens 4 (see FIG. 1). When the tested surface 6 is disposed in this position, the wave front falling on the tested surface 6 does not coincide with the tested surface 6 in contour. Stated differently, the center of the approximate radius of curvature of the tested surface 6 is entirely out of coincidence with the center (focus 17) of the wave front of the optical flux L incident thereon. Thus, when the light flux L is caused to be incident on the tested surface 6 in a condition in which the shutter 16 is closed, a testing light beam reflected by the tested surface 6 and released from the converter lens 4 is not in the form of a light flux of parallel rays. This makes it necessary to arrange a multiplicity of light receiving sections on the right side and the left side in FIG. 7. When the testing light beam is incident on the light receiving surface 12a, the output of the light receiving element 12 is as indicated by a wave form C1 shown in FIG. 7.

Figure 3:
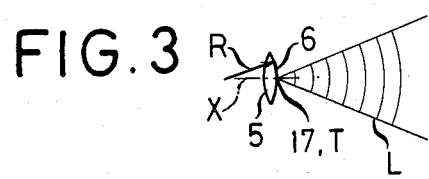

FIG. 3 shows the tested lens 5 located in a position which is rightwardly of its position shown in FIG. 2 along it center axis X, wherein the vertex T of the tested surface 6 coincides with the focus 17 of the converter lens 4. When the tested lens 5 is in this position, the light flux L converges into a point located on the vertex T, so that the testing light beam reflected by the tested surface 6 passes through the original path in an opposite direction and is in the form of a light flux of parallel rays when it has passed through the converter lens 4 again. Thus, the testing light beam converges into a point when it is incident on the light receiving surface 12a, so that the output of the light receiving element 12 is in the form a wave designated by C2 in FIG. 8 which shows a peak value.

Figure 4:
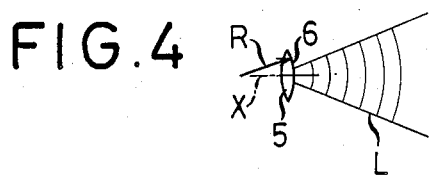
Figure 9:
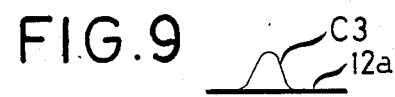

Further movement of the tested lens 5 rightwardly in FIG. 1 brings it to a position shown in FIG. 4. When the tested lens 5 is in this position, the output of the light receiving element 12 is in the form of a wave designated by C3 in FIG. 9 which does not show a peak value as is the case with the wave form C2 shown in FIG. 7.

Figure 8:
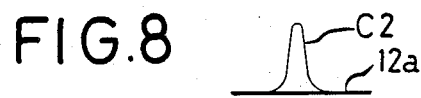
Figure 5:
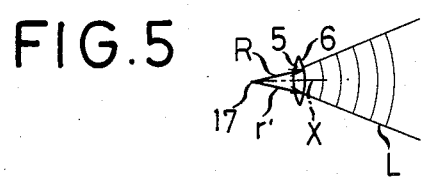
Figure 10:
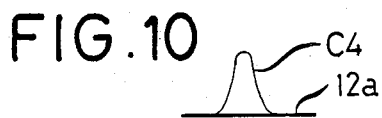

Further movement of the tested lens 5 rightwardly from its position shown in FIG. 4 brings it to a position shown in FIG. 5. If the tested surface 6 of the tested lens 5 located in the position shown in FIG. 5 substantially coincides with a wave front (its radius of curvature is designated by r') which falls thereon, then the approximate radius of curvature R of the tested surface 6 and the center thereof are substantially in coincidence with the radius of curvature r' and the center respectively of the wave front. The testing beam reflected by the tested surface 6 and passing through the converter lens 4 at this time is substantially in the form of a light flux of parallel rays which is incident on the light receiving element 12 in the form of a point. Thus, the output of the light receiving element 12 is in the form of a wave designated by C4 in FIG. 10 which shows a peak value as is the case with the outputs shown in FIG. 8. Here, the terms "substantially coincide" and "substantially in the form of a light flux of parallel rays" are used because if there were irregularities on the tested surface 6, such surface would not be in perfect coincidence with the wave front falling thereon, so that the testing light beam released from the converter lens 4 would not be in the form of a light flux of perfectly parallel rays. On the other hand, the wave front of the testing light beam reflected by the point T on the tested surface 6 is influenced with difficulty by irregularities which might be present on the surface 6. This accounts for the fact that the output of the light receiving element 12 in the form of the wave designated by C2 in FIG. 8 is higher is value than the output thereof in the form of the wave designated by C4 in FIG. 10.

Figure 6:
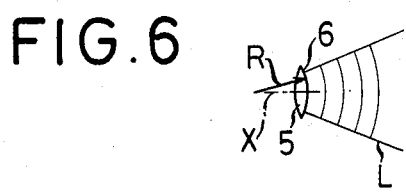
Figure 11:
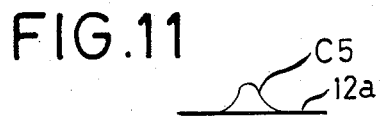

Further movement of the tested lens 5 from its position shown in FIG. 5 to a position shown in FIG. 6 brings the tested surface 6 out of coincidence with a wave front of the light beam falling thereon in contour, giving to the output of the light receiving element 12 a wave form designated by C5 in FIG. 11.

As described hereinabove, when the tested lens 5 is successively moved from the position shown in FIG. 2 to the position shown in FIG. 6 and the testing light beam is caused to be incident on the light receiving element 12 while the shutter 16 remains closed, the distribution of the intensity of light or the wave form of the output of the light receiving element 12 shows a peak value (wave forms, C2 and C4) when the tested surface 6 is in the positions shown in FIGS. 3 and 5.

When the tested surface 6 is tested for its surface conditions by means of an interferometer, it is necessary, besides performing focusing to bring the tested surface 6 to a focusing position, to determine the radius of curvature of the reference wave front which falls on the tested surface 6 disposed in the focusing position for the purpose of determining the contour of the tested surface. Testing of the tested surface 6 performed by using an interferometer shown in FIG. 1 is based on the interference between the testing light beam and the reference beam, and the result of the test shows the difference in shape between the reference wave front and the tested surface. Thus, to determine the actual contour of the tested surface based on the result of test would make it necessary to determine beforehand the radius of curvature of the reference wave front. The same applies to a test performed by means of a shearing interferometer which uses no reference light beam.

Assume that the tested lens 5 is located in the position shown in FIG. 3. When the tested lens 5 is in this position, the vertex T of the tested surface 6 coincides with the center of a wave front of the light flux L or the focus 17 of the converter lens 4. Thus, by moving the tested lens 5 rightwardly a predetermined distance as presently to be described by using this position as a reference position, it is possible to perform focusing accurately and without any trouble while determining the radius of curvature of the reference wave front.

Several methods which may be performed to achieve focusing will be described. Regardless of what method is used, the tested surface 6 is first brought to the position shown in FIG. 3 (which will hereinafter be referred to as a reference position). When the tested surface 6 is in the reference position, the output of the light receiving element 12 has a wave form C2 which shows a peak value. This makes it possible to readily place the tested surface 6 in the reference position. In a first method, the tested lens 5 is moved rightwardly from the reference position to a position in which the output of the light receiving element 12 has a wave form C4 which also shows a peak value or the position of the tested surface 6 shown in FIG. 5. This position is used as the focusing position of the tested surface 6. The distance covered by the movement of the tested lens 5 from the reference position shown in FIG. 3 to the focusing position shown in FIG. 5 during the above-mentioned operation is measured (the measurement can be readily and accurately obtained by using a pulse motor as subsequently described), and the distance is used as the radius of curvature of the reference wave front. In the condition shown in FIG. 5, the approximate radius of curvature R of the tested surface 6 and the radius of curvature r' of a wave front falling on the tested surface 6 are in coincidence with each other. Thus, it is possible, to use this wave front as a reference wave front and also to use the position of the tested surface 6 shown in FIG. 5 as a focusing position thereof. The tested surface 6 can thus be readily brought to a focusing position and the radius of curvature of the reference wave front can be readily determined.

In a second method, the tested surface 6 is moved rightwardly from the reference position shown in FIG. 3 a distance corresponding to the radius of curvature of the tested surface 6 decided when the tested lens 5 was designed (hereinafter designed radius), and the position which the tested surface 6 adopted is used as a focusing position. The designed radius is used as the radius of curvature of the reference wave front. When this method is used, the tested surface 6 and the reference wave front will not usually coincide with each other in the radius of curvature if the actual radius of curvature of the tested surface 6 differs from the designed radius due to a production error committed when the lens was produced. However, the difference between in the radius of curvature between the tested surface 6 and the reference wave front is very small and causes no trouble.

A third method is capable of obviating a defect of the first method referred to hereinabove. To enable the third method to be thoroughly understood, the defect of the first method will be described.

Figure 12:
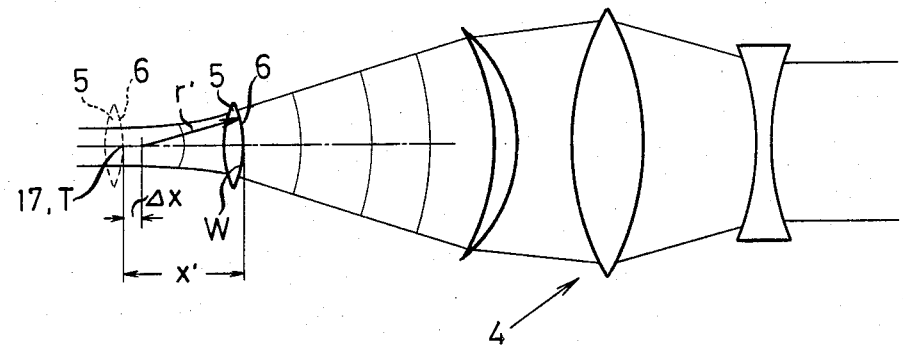
FIG. 12 is a view in explanation of the trouble which might occur when the focus of the converter lens is spread.

If the converter lens 4 is accurate in dimensions and the focus 17 thereof is a point, the centers of the wave fronts shown in FIGS. 2 to 6 will also coincide with the focus 17 in the form of a point. When focusing is performed by the first method, the distance covered by the movement of the tested surface 6 from the reference position (shown in FIG. 3) to the position shown in FIG. 5 will coincide with the radius of curvature of the reference wave front, causing no trouble at all. However, if the focus 17 of the converter lens 4 spreads in a direction perpendicular to the center axis X of the converter lens 4 due to a production error as shown in FIG. 12, the center of the radii of curvature of the wave fronts will not coincide at all with the focus 17 in position. When this is the case, if the tested lens 5 is placed in the reference position (the position shown in FIG. 3) shown in broken lines in FIG. 12 to bring the vertex T of the tested surface 6 into alignment with the focus 17 according to first method, and if the tested lens 5 is then moved rightwardly a distance x' to a solid line position (the position shown in FIG. 5) in which the tested surface 6 is substantially in coincidence with a wave front W (the reference wave front according to the first method) which falls thereon, the center of the radius of curvature r' of this wave front W will be displaced from the focus 17 in the direction of the center axis X by a distance $\Delta x$. Thus, the distance x' covered by the movement of the tested lens 5 will be $r' + \Delta x$ which is distinct from r'. Even if this situation occurs, the distance $x'(=r'+\Delta x)$ becomes the radius of curvature r' of the reference wave front W in the first method, thereby making it impossible to accurately determine the contour of the tested surface 6. To obviate this defect, the third method provides a compensating curve by means of a reference standard by taking into consideration of the displacement $\Delta x$, so that the radius of curvature of a reference wave front can be accurately determined based on the compensating curve.

Figure 13:
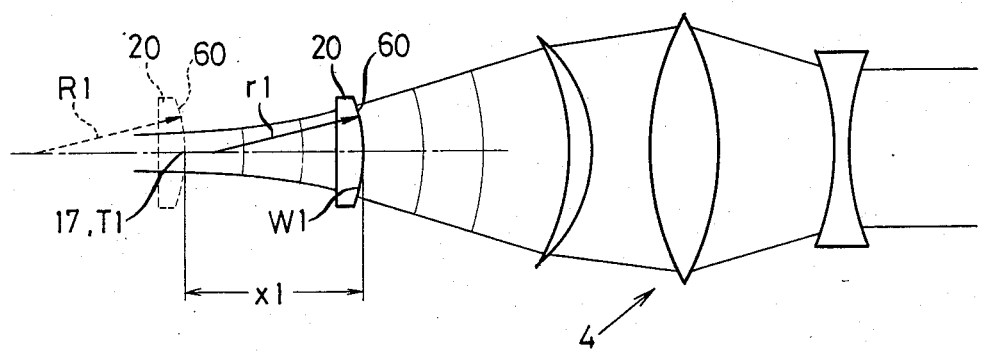
FIG. 13 is a view in explanation one example of the method for obtaining a compensating curve.
Figure 14:
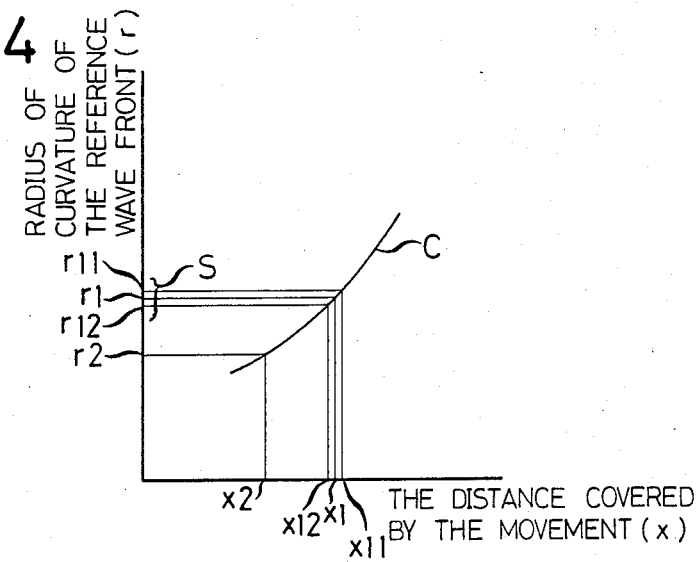
FIG. 14 is a graph showing one example of the compensating curve.
Figure 15:
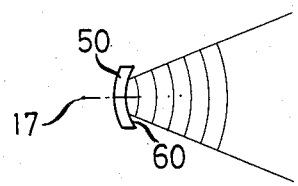
FIGS. 15 to 19 are views corresponding to FIGS. 2 to 6, respectively, in which the tested surface is that of a concave mirror.
Figure 16:
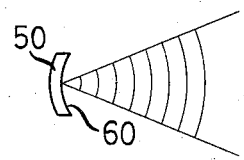
Figure 17:
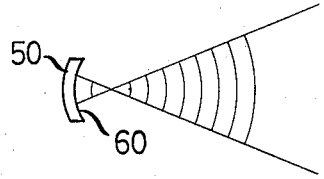
Figure 18:
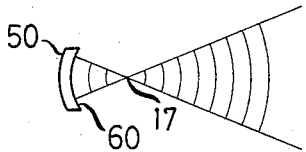
Figure 19:
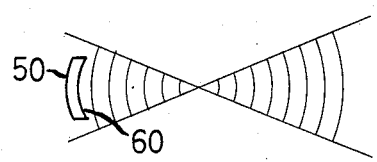

FIG. 13 shown one example of the third method in which a reference standard 20 produced accurately to have a reference face 60 of a radius of curvature R1 incorporated therein is placed in a broken line position which is a reference position (the position shown in FIG. 3), and the vertex T1 of the reference standard 20 is brought into coincidence with the focus 17 of the converter lens 4. In this case, the reference position of the reference standard 20 can also be readily determined by the output of the light receiving element 12 which has the wave form C2 showing a first peak value. Thereafter, the reference standard 20 is moved rightwardly to a position in which the output of the light receiving element 12 has the wave form C4 which shows a second peak value, to bring the reference face 60 into coincidence with a wave front W falling thereon (the same condition as shown in FIG. 5). The position in which the reference standard 20 is located at this time is the accurate focusing position of the reference standard 20 which can be denoted by R1 if the radius of curvature of a reference wave front W1 is denoted by r1. The distance x1 covered by the movement of the reference standard 20 from the reference position to the focusing position during the operation described hereinabove is measured. Thus, it is possible to determine the relation between the distance X1 covered by the movement of the reference standard 20 and the radius of curvature R1 thereof or the radius of curvature r1 of the reference wave front W1. Then, the same process as described hereinabove is repeated by using another reference standard produced accurately to have a reference face of another radius of curvature R2 incorporated therein, and the relation between a distance x2 covered by the movement of the reference standard and the radius of curvature R2 or a radius of curvature r2 of a reference wave front falling on the reference standard is determined. This process is repeated by using a plurality of reference standards having reference faces of different radii of curvature. The result of this is that a compensating curve C representing the relation between the radius of curvature R of the reference wave front and the distance X covered by the movement of the reference standard can be obtained as shown in FIG. 14.

The compensating curve C is used when a focusing operation is performed. Assume that when the tested surface 6 is moved from the reference position (shown in FIG. 3) in which the output of the light receiving element 12 has the wave form C2 showing the first peak value to the focusing position (shown in FIG. 5) in which the output thereof has the wave form C4 showing the second peak value, the distance covered by the movement of the tested surface 6 is denoted by x1. Then, it can be determined from the compensating curve C shown in FIG. 14 that the radius of curvature R of a wave front falling on the tested surface 6 located in the focusing position or a reference water front is r1. Likewise, when the distance covered by the movement of the tested surface 6 is x2, it is possible to determine from the compensating curve C that the radius of curvature R of the reference wave front is r2. It will be understood that this operation can be performed by using a computer, so that the radius of curvature of the reference wave front can be automatically obtained and the actual contour of the tested surface can be measured based on the radius of curvature of the reference wave front.

According to the third method, the radius of curvature R of the reference wave front is obtained based on the distance covered by the movement of the tested surface 6 from the position in which the light receiving element 12 shows the first peak value (reference position) to the position in which it shows the second peak value (focusing position). Thus, this is the method best serving the purpose of obtaining the radius of curvature of the reference wave front for different forms of tested surface. However, when this method is relied on for comparing the results of testing of a plurality of tested surfaces of the same designed radius, the method suffers the following disadvantage.

More specifically, assume that there are two lenses to be tested which are of the same designed radius, and that they are distinct from each other in the actual approximate radius of curvature of its tested surface due to a production error. Then, when an attempt is made to rely on the third method in performing focusing, the distances covered by their movements from the reference position to the focusing position will show a slight difference. If the distances covered by their movements are denoted by x11 and x12 respectively as shown in FIG. 14, the radii of curvature of reference wave fronts are denoted by r11 and r12 respectively. Thus, even if the lenses to be tested have the same designed, radius, the reference wave fronts may have different radii of curvature when the tested lenses are brought to the respective focusing positions.

Meanwhile, the result of a test performed on each tested surface is expressed as a value corresponding to the difference between the contour of the reference wave front and the actual contour of the tested surface. For example, if the result of testing is indicated by a three-dimensional display, the display will indicate the difference between the actual contour of the tested surface and the contour of the reference wave front. Thus, when the third method is used to perform focusing to perform a test by means of an interferometer, a value corresponding to an irregularity on the tested surface or a distortion thereof will be indicated as an image, and it will be impossible to test the tested surface according to the radius of curvature. Accordingly, when an attempt is made to compare with each other on a display the results of a test performed on a plurality of tested surfaces, the difference between the contour of the tested surface and the contour of the reference wave front is preferably determined by rendering the radii of curvature of the reference wave fronts for the respective tested surfaces equal to each other. However, even if an attempt is made to compare on a display the results of tests performed on two tested surfaces which are equal to each other in the designed radius but differ from each other in the actual approximate radius of curvature, difficulties will be experienced in attaining the end because the reference wave fronts for the respective tested surfaces are distinct from each other in the radius of curvature.

A fourth method is a modification of the third method for performing focusing. In this method, even if the distances covered by the movements of the two tested surfaces having the same designed radius are $x11$ and $x12$ and the radii of curvature of the reference wave fronts for the two tested surfaces are $r11$ and $r12$ respectively, the radii of curvature of the reference wave front for the tested surfaces are all made to match a set radius of curvature which, being designated by $r1$, for example, is set beforehand for the designed radius. With the designed radius being equal, the tested surfaces show no great variation in the approximate radius of curvature, and the distances ($x11$ and $x12$) covered by the movements of the tested surfaces show no great variation, and the radii of curvature $r11$ and $r12$ of the reference wave fronts corresponding to the distances $x11$ and $x12$ can be brought within a predetermined range S (see FIG. 14). In this method, the radii of curvature of the reference wave fronts for each designed radius are brought within a predetermined range. In actual practice, when focusing is performed by relying on the third method, if the radii of curvature of the reference wave fronts are within a predetermined range or a range S, for example, then the radii of curvature R of the reference wave fronts used in calculation is rendered $r1$. At this time, the tested surfaces may be located in positions corresponding to $x11$ and $x12$ respectively merely by replacing the value R of the radius of curvature of the reference wave front by $r1$, or the positions of the tested surfaces may be readjusted to bring the distances X covered by the movements of the tested surfaces to $x1$ corresponding to $r1$. Thus, when it is desired to test a plurality of tested surfaces of the same designed radius and compare the results on a display, the radii of curvature of the reference wave fronts may be rendered uniform by relying on the fourth method, to thereby readily compare the results of tests performed on them with each other. Control of focusing performed by means of the fourth method may, of course, be effected by means of a computer.

In the foregoing description, the invention has been shown and described by referring to an embodiment in which a lens having a surface which is spherical in contour is tested. However, the invention is not limited to this specific contour of the tested surface and may have application in testing surfaces which have suitable contours other than the spherical shape. FIGS. 15 to 19 show an embodiment in which the surface of a concave mirror 50 is tested. FIGS. 15 to 19 correspond to FIGS. 2 to 6 respectively. When the tested mirror 50 has a tested surface 60 which is concave in contour, the position of the concave mirror 50 in which the tested surface 60 and a wave front falling on it substantially coincide with each other (or the position corresponding to the position shown in FIG. 5) is a position shown in FIG. 18. When the concave mirror 50 is located in this position, the tested surface 60 is disposed leftwardly of the focus 17 of the converter lens 4 in FIG. 18. Thus, if the concave mirror 50 is moved leftwardly from its position shown in FIG. 15 in which it is disposed rightwardly of the focus 17, for example, then the position of the mirror 50 is a reference position corresponding to the position shown in FIG. 3 when the position is a shown in FIG. 16. When the concave mirror 50 is disposed in the position shown in FIG. 16 or the reference position, the output of the light receiving element 12 has a wave form showing a first peak value. When the concave mirror 50 is moved further leftwardly from the position shown in FIG. 16 to a position shown in FIG. 18, the output of the light receiving element 12 has a wave form showing a second peak value.

The invention can have application in testing a surface which is not spherical in shape. When a non-spherical surface is tested, a light beam of a wave front of the same shape as the non-spherical tested may be caused to be incident on the tested surface. When the shape of the tested surface which is non-spherical is nearly spherical, a light beam of a spherical wave front may be caused to be incident on the tested surface. When a test is performed on a nonspherical surface, focusing may be performed by various methods described hereinabove and the radius of curvature of the reference wave front can be obtained, regardless of the type of the light beam incident on the tested surface.

Figure 20:
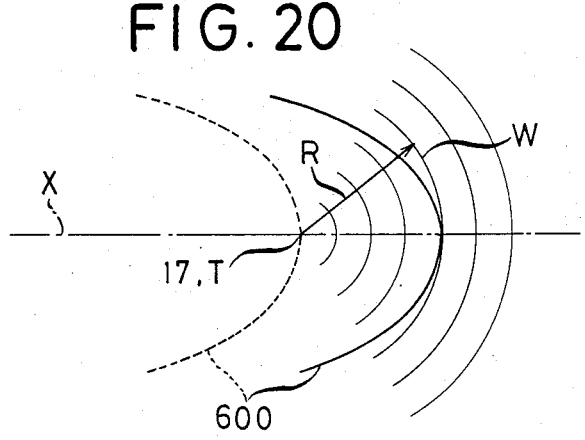
FIG. 20 is a view showing one example of the reference position and the focusing position when the tested surface is a non-spherical surface.

FIG. 20 shows one example of a test performed on a non-spherical surface by causing a light beam of spherical wave form to be incident on the tested surface. When a tested surface 600 of non-spherical shape is located in a reference position indicated by a broken line in FIG. 20, the focus 17 of a converter lens, not shown, coincides with the vertex T of the tested surface 600, and the output of a light receiving element has a wave form showing a peak value as is the case with the wave form C2 shown in FIG. 8 obtained by a test performed on the tested surface 6 shown in FIG. 3. The tested surface 600 may be moved, in accordance with the second method, rightwardly a distance corresponding to the radius of curvature R at the vertex T to a focusing position indicated by a solid line, and a reference wave front W of the radius of curvature R may be caused to be incident on the tested surface 600. Alternatively, the tested surface 600 may be moved from the reference position in accordance with the first, second or fourth method, to perform focusing. In the latter case, the reference wave front may be brought to a condition in which it crosses the tested surface 600.

However, no matter what method may be used, the tested surface 600 is moved a predetermined distance from the reference position and focusing is performed in the same manner as focusing is performed in the embodiments described hereinabove. Thus, the radius of curvature of the reference wave front can be determined with increased accuracy.

Figure 21:
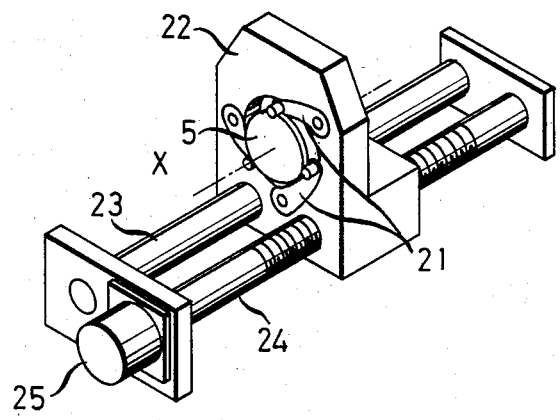
FIG. 21 is a perspective view showing schematically one example of the actuating means for moving an article to be tested.

FIG. 21 shows one example of actuating means for moving an article to be tested in the direction of its center axis X. The actuating means which is known per se comprises a support 22 having a chuck 21 for gripping an article to be tested, such as a lens 5, and guide rods 23 for guiding the support 22 as the latter is moved in the direction of the center axis X by a feed screw 24 threadably engaging it when the feed screw 24 is rotated. The feed screw 24 may be in the form of a ball screw having a ball engaged in a threaded groove. The feed screw 24 is driven for rotation by a pulse motor 25 activated by pulses supplied from a computer to rotate the feed screw 24. When the support 22 or the tested article is moved from the reference position shown in FIG. 3 to a focusing position, the number of pulses supplied to the pulse motor 25 is counted simultaneously as initiation of operation of the actuating means to move the tested article from the reference position to enable the radius of curvature of a wave front falling on the tested article in each of its positions during its movement to be calculated.

In the embodiment described by referring to the interferometer shown in FIG. 1, the shutter 16 is mounted to prevent the reference light beam reaching the light receiving element 12 while focusing is being performed. However, the provision of the shutter 16 is not essential and the shutter 16 may be dispensed with by arranging the second beam splitter 10 between the first beam splitter 3 and the converter lens 4 in place of mounting same in the position shown in FIG. 1, to thereby enable light reflected by the second beam splitter in this position to be incident on the light receiving element 12.

The invention can have application in the shearing interferometer. In this application, a testing light beam reflected by an article being tested only has to be reflected by a beam splitter and caused to be incident on a light receiving element. When it is desired to cause one of two testing light beams shorn and superposed one over the other to be incident on the light receiving element, one only has to block the passage of the other testing light beam by means of a shutter. If a testing light beam is caused to be incident on the light receiving element before it is shorn into two sections or before the two sections are superposed one over the other, the need to use a shutter is eliminated.

What is claimed is:

1. A focusing method for an interferometer comprising the steps of:

passing a collimated light beam through a converter lens to convert the shape of the wave fronts of the light beam to be spherical and causing said light beam to be incident on a tested surface;

collecting the light beam which is reflected by said tested surface and substantially collimated back through said converter lens, and passing said reflected light beam through a condenser lens so as to be incident on a light receiving element capable of measuring the distribution of intensity of the light beam in at least one dimension;

moving the tested surface in the direction of its center axis until it reaches a reference position in which the vertex of the tested surface is brought into coincidence with the focus of the converter lens and the light receiving element measures an output of a peak value; and moving the tested surface from said reference position further in the direction of its center axis until it reaches a focusing position in which the center of the radius of curvature of the spherical wave front of the incident light beam falling on the tested surface is brought into coincidence with the focus of the converter lens and the light receiving element measures an output of another peak value, wherein the distance between said reference position and said focusing position provides an approximate measure of the radius of curvature of said spherical wave front of said incident light beam.

2. A focusing method as claimed in claim 1, wherein the tested surface is moved in said second moving step from said reference position to the focusing position by a distance corresponding to the designed radius of the tested surface.

3. A focusing method as claimed in claim 1, further comprising the steps of using a reference standard formed accurately to have the radius of curvature of a reference surface and moving said reference standard from a reference position in the direction of its center axis to a focusing position while measuring the distance covered by the movement of the reference standard and to determine the relation between the distance covered by the movement of the reference standard and the radius of curvature of a reference wave front falling on the reference standard when the latter is located in the focusing position, and repeatedly performing the step described hereinabove by using a plurality of reference standards having different radii of curvature to prepare a graph indicating the relation between the distances covered by the movements of the reference standards and the radii of curvature of the reference waves to enable a focusing operation to be performed by using said graph.

4. A focusing method as claimed in claim 1, wherein when focusing of a plurality of tested surfaces having the same designed radius but differing from each other in the actual approximate radius of curvature is performed, focusing is performed by following the steps described in claim 1 after causing the radii of curvature of reference wave fronts falling on the tested surfaces to match a set radius of curvature which is predetermined with respect to the designed radius of the tested surfaces.

* * * * *